No. 682,291. Patented Sept. 10, 1901.
J. F. STEWARD.
CORN HUSKING MACHINE.
(Application filed Apr. 1, 1901.)

(No Model.) 2 Sheets—Sheet 1.

WITNESSES: INVENTOR.
Chas. W. Chambers. John F. Steward
Wm. A. Dreffein.

No. 682,291. Patented Sept. 10, 1901.
J. F. STEWARD.
CORN HUSKING MACHINE.
(Application filed Apr. 1, 1901.)
(No Model.) 2 Sheets—Sheet 2.

WITNESSES: Chas. N. Chambers. Wm. A. Dreffein.

INVENTOR. John F. Steward

UNITED STATES PATENT OFFICE.

JOHN F. STEWARD, OF CHICAGO, ILLINOIS.

CORN-HUSKING MACHINE.

SPECIFICATION forming part of Letters Patent No. 682,291, dated September 10, 1901.

Application filed April 1, 1901. Serial No. 53,759. (No model.)

*To all whom it may concern:*

Be it known that I, JOHN F. STEWARD, of Chicago, in the county of Cook and State of Illinois, have invented certain new and useful Improvements in Corn-Husking Machines, of which the following is a full description, reference being had to the accompanying drawings, in which—

Figure 1:
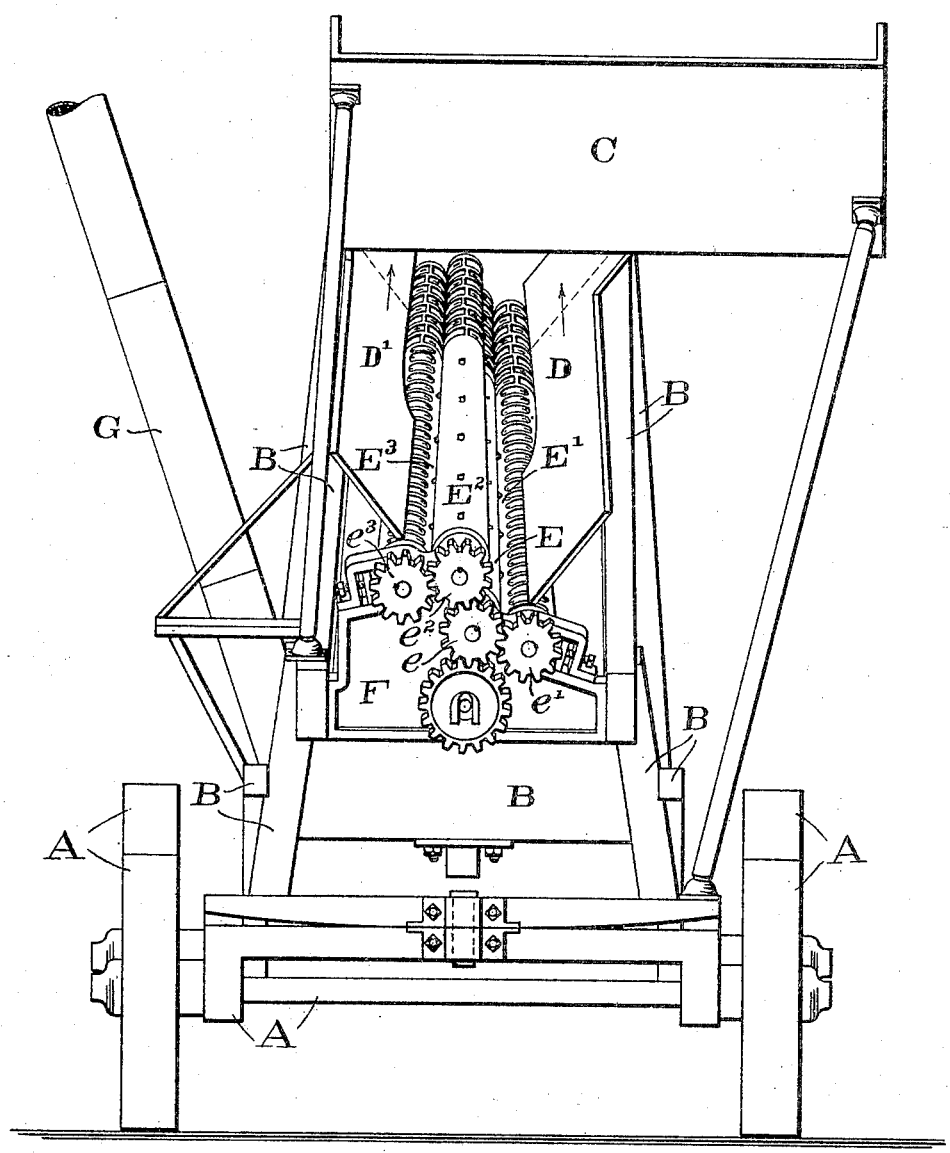
Figure 2:
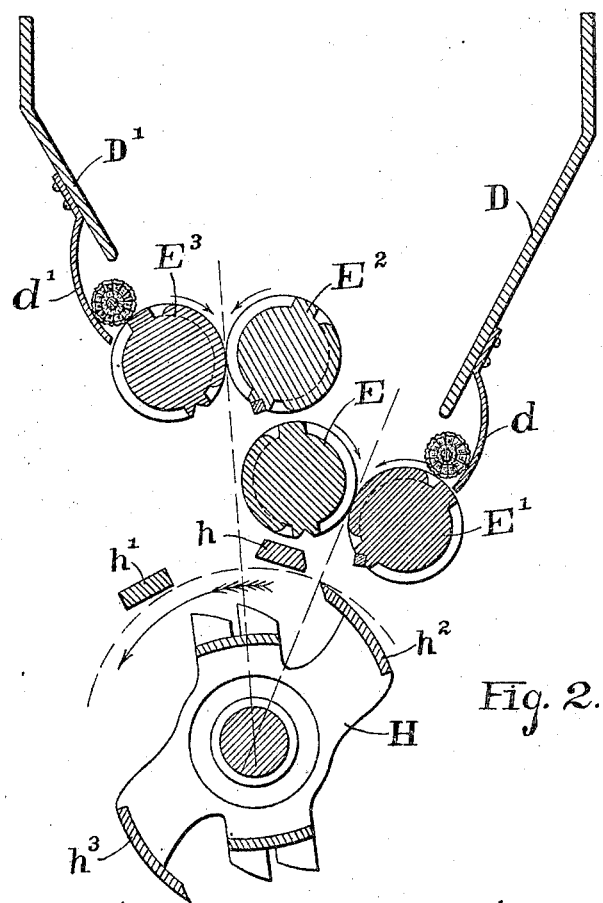
Figure 3:
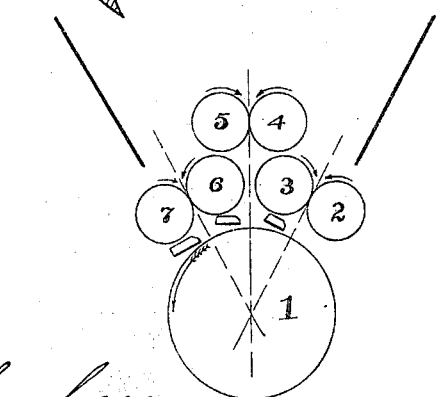

Figure 1 is a delivery-end view of a corn-shredder of the type shown, described, and claimed in the patent granted to August Rosenthal, No. 639,614, dated December 19, 1899. Fig. 2 is a sectional view of the machine as if cut on the lines X X of Fig. 1 when looking in the direction indicated by the arrows, and Fig. 3 is a proposed arrangement where six rollers are to be used.

For all details of this machine not forming the subject-matter of my invention reference is had to the Rosenthal patent above mentioned. In the patent referred to there is only a single pair of rolls; but in the patent granted to August Rosenthal, No. 575,376, dated January 19, 1897, two pairs of rolls are shown.

My invention principally consists in arranging the rolls so as to avoid the necessity of any device for dividing the mass of stalks presented before being engaged by the rollers; and it consists in so placing the rollers that one of them shall form the dividing device, but not only that, a moving one.

In the drawings the parts marked A are the truck, upon which the husker, and incidentally a shredder, is mounted, and the parts lettered B portions of the main frame.

C is the feeding-table, upon which the stalks are placed. The bottom only is shown in Fig. 1.

D and D' are the sides of the hopper. Stalks placed upon the table are moved downward butt first into the hopper formed by the parts D and D'. At the bottom of the hopper are the rollers E, E', $E^2$, and $E^3$. They move in the directions indicated by the arrows. These rollers terminate in journals at each end, duly supported in bearings formed upon the casting F. Upon them are the gears $e$, $e'$, $e^2$, and $e^3$. The roller E is driven at its upper end by suitable gearing, and so far as the present invention is concerned it may be considered the motor-shaft. The gear $e$ keyed to it meshes into the gear $e'$, and thus the pair of rollers E and E' is caused to rotate in opposite directions and engage stalks between them and move them down. The gear $e^2$, secured to the shaft of the roller $E^2$, receives motion from the gear $e$. Upon the shaft of the roller $E^3$ is the gear $e^3$. By the intermeshing of the gears $e^2$ and $e^3$ the rollers $E^2$ and $E^3$ are caused to move in opposite directions and engage stalks and force them downward. The ears upon the stalks are engaged by the rollers in the usual manner and forced from their stem. In order to permit the ears to fall away laterally where the cornstalks are introduced, I narrow the boards D and D' at the lower edges so as to permit ears to escape in those directions, so that any ears will not be held from passing onward by stalks that are being fed through at lower points along the rollers. In Fig. 2 an ear is shown in the space provided for its escape. The metal guides $d$ and $d'$ prevent the ears from passing beyond the rollers. The ears are not allowed to pass so far over the rollers that the movement of the said rollers will not bring them back to position so that the husks may be engaged between them and pulled off.

G is the exhaust-pipe of the ordinary fan used upon corn-shredders.

H is the cutting and shredding head, and $h$ and $h'$ the bars that serve to hold the stalks against the action of the knives $h^2$ and $h^3$. In Fig. 3 the large circle may be considered to represent the path of movement of the knives, and 2 3, 4 5, 6 7 three pairs of rollers. The intention of this figure is to show the arrangement of that number of rollers relative to the cutting-head.

In operation the stalks are moved from the table butt first into the hopper. In the Rosenthal patent, No. 575,376, a dividing device 110 is shown. As the space between this dividing device and the side of the walls is not great, trash is inclined to accumulate upon the dividing device, stalks hang over it, and ears lodge by resting one end upon this device and the other end upon the boards of the hopper. My invention overcomes this, the roller $E^2$ serving as the dividing device. I find in practice that anything striking the roller $E^2$ will be carried by it to position to pass between it and $E^3$ and anything that does not strike it is either already in position to pass between those rollers or in position to pass between the rollers E and E'. By the arrangement of rollers so that one roller shall serve as means for dividing the mass of stalks thrown into the hopper the capacity of the machine is greatly increased.

What I claim is—

1. In a corn-husking machine the combination of a feeding-table and two or more pairs of rollers, said rollers inclined longitudinally beneath said table, the rollers of each pair lying substantially side by side, one roller of one pair overlying one roller of the other pair, substantially as described.

2. In a corn-husking machine a feeding-table having husking-rollers lying beneath, the said rollers adapted, at their upper ends, to receive the stalks and force the ears therefrom, and the lower portions of the rollers adapted to husk the ears, said rollers lying side by side in pairs, one roller of one pair beneath one roller of the other pair, whereby the roller which lies above the other serves as a moving dividing device, all combined substantially as described.

3. In a corn-husking machine a hopper, inclined husking-rolls, a hopper having its sides cut away at its lower edges to permit the ears to escape laterally, so that they shall not interfere with the entrance of the butts of the stalks between the rollers, all combined substantially as described.

In testimony whereof I affix my signature in the presence of two witnesses.

J. F. STEWARD.

Witnesses:
CHAS. N. CHAMBERS,
WM. A. DREFFEIN.